Nov. 11, 1930.   J. P. LIDIAK   1,781,024
CONDENSER
Filed Oct. 4, 1929   2 Sheets-Sheet 1

WITNESS
E. Lutz

INVENTOR
J. P. Lidiak
BY
A. B. Reavis
ATTORNEY

Nov. 11, 1930.                J. P. LIDIAK                1,781,024
                               CONDENSER
                         Filed Oct. 4, 1929        2 Sheets-Sheet 2
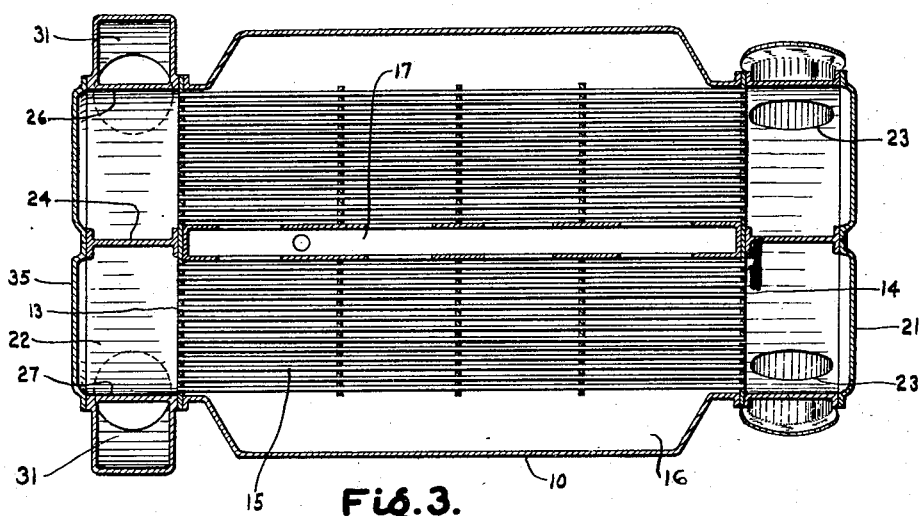
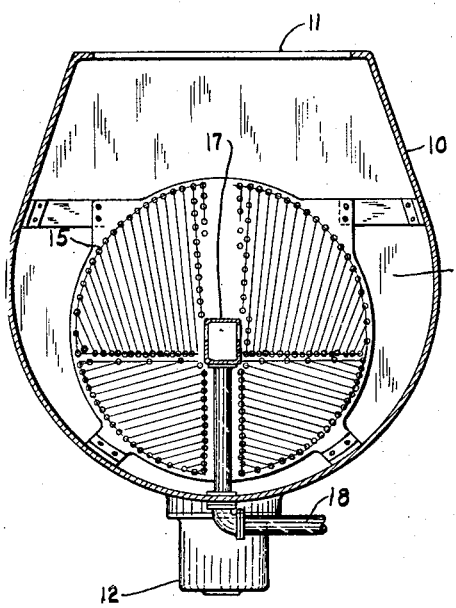
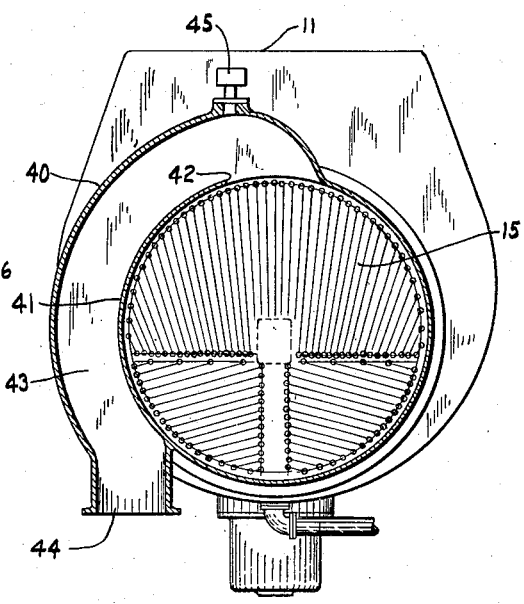
WITNESS
Ĉ. Lutz
INVENTOR
J.P. Lidiak
BY
A. M. Reavis
ATTORNEY Patented Nov. 11, 1930

1,781,024

UNITED STATES PATENT OFFICE

JOSEPH P. LIDIAK, OF LANSDOWNE, PENNSYLVANIA, ASSIGNOR TO WESTINGHOUSE ELECTRIC & MANUFACTURING COMPANY, A CORPORATION OF PENNSYLVANIA

CONDENSER

Application filed October 4, 1929. Serial No. 397,354.

My invention relates to heat exchange apparatus and particularly to steam condensers of the surface type and it has for an object to provide apparatus of the character designated which shall embody improved circulating water features.

It has for a further object to provide a condenser having an outlet water box so arranged that the circulating water may be discharged from the lower portion thereof while, at the same time, complete flooding of all of the tubes of the nest is assured.

It has for a further object to provide an outlet water box for a condenser of the foregoing character which shall embody a dam structure, which dam structure shall be so arranged as to insure the maintenance of the proper level of water in the tube nest and, at the same time, shall not interfere with or make difficult inspection and renewal of the tubes of the nest.

It has for a further object to provide a condenser outlet water box which shall be equipped with a dam structure disposed laterally of the tube nest and so arranged as to be especially adapted for use with condensers of the radial flow type.

These and other objects are effected by my invention, as will be apparent from the following description and claims taken in connection with the accompanying drawings and forming a part of this application, in which:

Fig. 3 is a plan view, in section, of the condenser taken on the line III—III of Fig. 1;

Fig. 4 is a transverse, sectional view through the condenser shell and tube nest and is taken on the line IV—IV of Fig. 1; and, Fig. 5 is a transverse, sectional view of another form of water box arranged in accordance with my invention and which differs from the embodiment shown in Fig. 2 in that it is not of the divided water box type.

Figure 1:
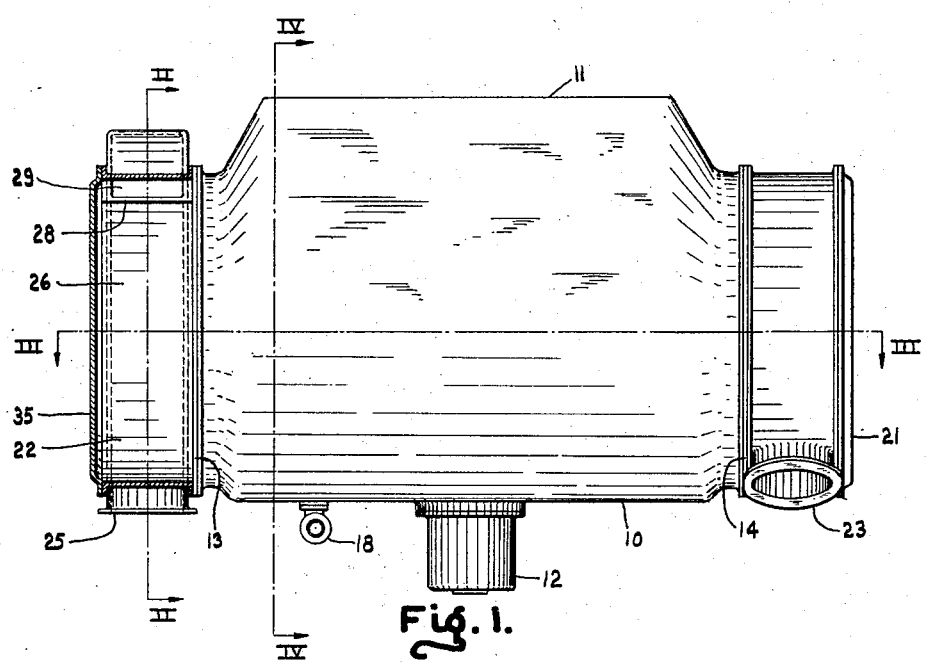
Fig. 1 is a longitudinal view of one form of condenser arranged in accordance with my invention and showing the outlet water box in cross-section, the cross-section of the outlet water box being taken on the line I—I of Fig. 2.

In the construction and installation of condensers, and particularly condensers of the larger capacities, it has been the conventional practice to supply the circulating water to the lower portion of the inlet water box and to discharge the circulating water from the upper portion of the outlet water box. Such an arrangement insures that the tube nest is always completely flooded and that the entire water circulating system may be readily vented. However, as a general rule, the circulating water intake and discharge ducts or tunnels of the power plant are usually located beneath the floor on which the condenser is supported and hence it becomes necessary to extend a conduit from the upper portion of the outlet water box of the condenser to the discharge duct or tunnel beneath the floor. Inasmuch as pipes of this character may assume a size of the order of 50 or 60 inches in diameter, it will be apparent that their installation is quite costly and that they occupy considerable space in the power plant.

It has therefore been proposed to provide the outlet water boxes of condensers with a bottom discharge connection and to provide, in the water box, a dam extending transversely thereof and so arranged that the water leaving the tube nest flows over the dam before arriving at the discharge connection. By providing such a dam, the tubes of the nest are always maintained in a completely flooded condition and, in addition, the water circulating system may be readily vented. However, such dams, as heretofore proposed, have been objectionable for the reason that they extend across the water box and in front of the tube nest and hence seriously interfere with, or make difficult, inspection and renewal of the tubes of the nest.

I have therefore conceived of a form of water box which embodies a dam structure located laterally of or to the side of the tube nest. By means of such an arrangement, all of the advantages obtained by having the dam extend transversely across the end or in front of the tube nest are obtained and, at the same time, the tubes of the nest are just as accessible as in a conventional condenser, that is, a condenser wherein no dam structure is provided and the water outlet is located at the top. The form of dam structure which I have devised is especially adapted for use with condensers of the radial flow type but, as will be apparent from the following description, the invention is also applicable to condensers of other types.

Referring now to the drawings, I show in Figs. 1 to 4, a condenser having a shell structure 10 provided with an exhaust inlet 11 and a condensate outlet 12. Located at each end of the shell structure 10 are tube sheets 13 and 14 between which extend a nest of cooling tubes 15. As shown particularly in Fig. 4, the tube nest 15 is preferably so arranged with respect to the interior of the shell structure 10 as to form an intervening steam delivery space 16 extending around a substantial portion of the periphery of the tube nest. Disposed within the interior of the tube nest 15 is an air off-take conduit 17 provided with an outlet 18, the off-take 17 being arranged to withdraw the steam and non-condensable gases in radial directions toward the interior or central portion of the tube nest. Such a condenser is known as a condenser of the radial flow type and is disclosed in United States Patent No. 1,142,784, issued June 8, 1915, to R. H. Ehrhart and assigned to the Westinghouse Electric & Manufacturing Company.

Located at one end of the shell structure 10 is an inlet water box 21 and at the other end of the shell structure an outlet water box 22. The inlet water box 21 is of the divided water box type and is provided with suitable inlets 23 located in the lower portion thereof, all arranged in the conventional manner. In the condenser shown in Fig. 1, the water boxes are so arranged that the cooling water passes in a single direction longitudinally through the tube nest. In other words, the condenser is of the single-pass type but it will be apparent from the further description that my condenser is also applicable to condensers of the multi-pass type.

Figure 2:
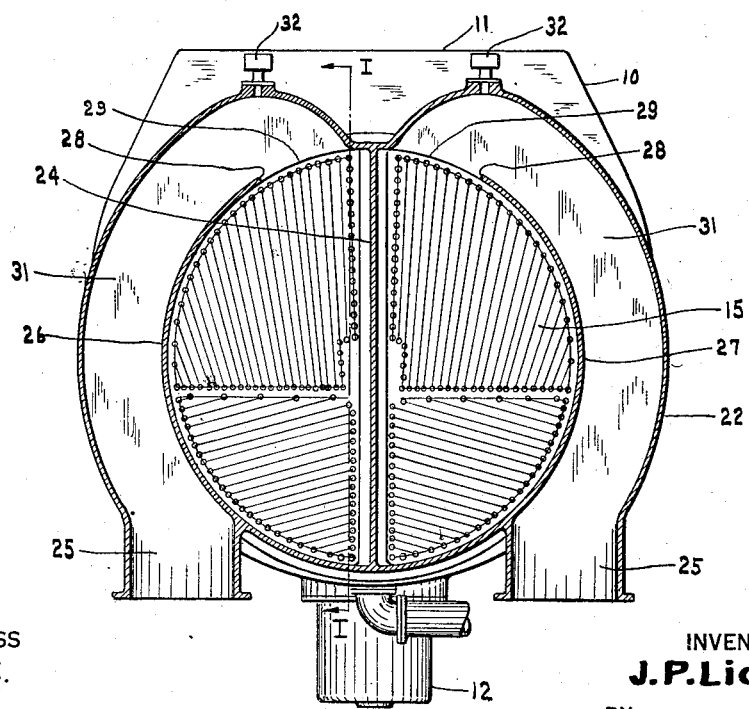
Fig. 2 is a transverse, sectional view through the outlet water box taken on the line II—II of Fig. 1.

Referring now to Fig. 2, the outlet water box 22 is provided with a central division wall 24 for dividing it into two sections for cleaning purposes. Each section has an outlet 25 located at the lower portion thereof and extending in a downward direction so that it may be readily connected to the water discharge tunnel of the power plant (not shown) and ordinarily located below the condenser floor. Extending upwardly from a lower, central portion of the water box and between the tube nest 15 and the outlets 25 are respective dam structures 26 and 27 curved or shaped so as to conform with the outer contour of the tube nest and terminating at 28 near the upper portion of the tube nest. As shown in Fig. 3, the dam structures extend, longitudinally, across the full width of the water box 22. The tops 28 of the respective dam structures 27 are so spaced from the walls of the water box as to provide intervening openings 29 connecting, respectively, with the outlets 25 by means of laterally disposed passageways 31.

As will be apparent from the foregoing description, in operation, cooling water for the condenser enters through the inlet connections 23 of the inlet water box 21 and circulates longitudinally through the tube nest and is discharged into two sections of the outlet water box 22 defined by the central division wall 24, and the respective dams 26 and 27. The water in the sections spills or overflows over the upper edges of the dams 26 and 27 and, by means of the openings 29, enters the passages 31 and is discharged from the condenser through the outlets 25. It will therefore be apparent that a minimum level of water coinciding with the upper edges 28 of the dams is always maintained in the condenser so that complete flooding as well as circulation of water through all of the tubes of the nest is assured. Inasmuch as the water, in traversing the condenser, enters at the lower portion thereof and rises to the top of the tube nest before leaving the condenser, the circulating system may be vented merely by providing suitable vent fittings, such as 32, at the top of the water box.

From inspection of Fig. 2, it will be apparent that the dam structures 26 and 27 are arranged laterally of, or to the side of the tube nest, so that they do not interfere to the slightest extent with inspection or renewal of any of the tubes of the nest. Complete access may be had to the tubes of the nest merely by removing the cover plate 35 of the outlet water box as is done in the conventional condenser, that is, condensers not provided with any dam structures.

From inspection of Fig. 3, it will be apparent that the laterally disposed passageways 31 do not project materially beyond the outer confines of the condenser shell in that condensers of the radial flow type have their shell structure 10 spaced laterally from the tube nest in order to provide an intervening steam delivery space 16 surrounding the tube nest. In other words, the provision of the lateral passageways 31 does not materially increase the maximum width of the condenser structure and, hence, a very compact arrangement is afforded. However, in this connection, it is to be understood that, while the structure disclosed herein lends itself especially to condensers constructed upon the radial flow or similar principles, nevertheless it will be apparent that the invention may also be applied to other types of condensers.

In the foregoing embodiment, I have shown a condenser of the divided water box type. However, as shown in Fig. 5, the idea may be readily applied to condensers wherein the water boxes are not divided. As shown in this figure, the outlet water box 40 is provided with a single dam structure 41 located on one side of the tube nest. The dam structure 41 terminates at 42 and defines with the outer wall of the water box 40 a passageway 43 connecting with a downwardly extending outlet 44. In operation, the circulating water enters the discharge water box 40 from the tube nest 15, spills over the dam 41 and is discharged through the passage 43 and outlet 44. If desired, a suitable vent fitting, such as 45, may be provided in the top of the water box.

While I have shown my invention in several forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. In a water circulating system for a condenser, a tube nest having water boxes located at each end thereof, one of said water boxes having an outlet connection located at its lower portion and an upwardly extending dam structure interposed between the outlet connection and the tube nest and terminating near the top of the tube nest, said dam structure being disposed laterally of the tube nest.

2. In a water circulating system for a condenser, a tube nest having water boxes located at each end thereof, one of said water boxes having an outlet connection located at its lower portion and an upwardly extending dam structure interposed between the outlet connection and the tube nest and terminating near the top of the tube nest, all of said dam structure extending in a longitudinal direction across the water box.

3. In a water circulating system for a condenser, a tube nest having water boxes located at each end thereof, one of said water boxes having an outlet connection located at its lower portion and an upwardly extending dam structure interposed between the outlet connection and the tube nest and terminating near the top of the tube nest, said dam structure being disposed outwardly of the tube nest and extending in a longitudinal direction across the water box.

4. In a water circulating system for a condenser, a tube nest having water boxes located at each end thereof, one of said water boxes having an outlet connection located in the lower portion thereof and a longitudinally extending dam structure interposed between the outlet connection and the tube nest, said dam structure extending upwardly adjacent to the outer boundary of the tube nest and terminating near the top of the tube nest.

5. In a water circulating system for a condenser, a tube nest having water boxes located at each end thereof, one of said water boxes having an outlet connection located in the lower portion thereof, a dam structure interposed between the outlet connection and the tube nest, said dam structure extending upwardly and terminating near the top of the tube nest, and passageway means embodied in said water box for conveying the water flowing over the dam structure to the outlet connection, said passageway means being disposed outwardly and laterally of the tube nest.

6. In a water circulating system for a condenser, a substantially cylindrical tube nest having water boxes located at each end thereof, one of said water boxes having an outlet connection located at its lower portion and a dam structure interposed between the outlet connection and the tube nest, said dam structure extending upwardly about the circumference of the tube nest and terminating near the top of the tube nest.

7. In a water circulating system for a condenser, a tube nest having water boxes located at each end thereof, one of said water boxes embodying partition means dividing said water box into first and second compartments communicating at their top portions, said first compartment being disposed in free communication with the tube nest for receiving water discharged therefrom, and an outlet connection for circulating water disposed in the lower portion of said second compartment, said second compartment being disposed outboard and laterally of the tube nest.

8. In a water circulating system for a condenser, a tube nest having water boxes located at each end thereof, one of said water boxes embodying partition means dividing said water box into first and second compartments communicating at their top portions, said first compartment being disposed in free communication with the tube nest for receiving water discharged therefrom, an outlet connection for circulating water disposed in the lower portion of said second compartment, said second compartment being disposed outboard and laterally of the tube nest, and a removable cover for providing access to the interior of the first compartment.

9. In a water circulating system for a condenser, a tube nest having water boxes located at each end thereof, one of said water boxes having a dam structure extending longitudinally thereacross and disposed outboard of the tube nest, said dam structure having an upper terminus located near the top of the tube nest, an outlet connection provided in the water box below the termius of the dam structure, and downwardly extending passageway means embodied in the water box for conveying circulating water spilling over the dam structure to said outlet connection.

10. In a water circulating system for a condenser, a substantially cylindrical tube nest having water boxes located at each end thereof, one of said water boxes having an arcuate dam structure extending longitudinally thereacross and disposed outboard of the tube nest, said arcuate dam structure having a terminus portion disposed near the top of the tube nest, an outlet connection provided in the water box below the terminus portion of the dam structure, and downwardly extending passageway means located outboard of the dam structure for conveying circulating water spilling over the dam structure to the outlet connection.

11. In a water circulating system for a condenser, a substantially cylindrical tube nest having water boxes located at each end thereof, one of said water boxes embodying an arcuate dam structure extending from the lower portion of the tube nest upwardly around the side of the tube nest and terminating near the top of the tube nest, said dam structure extending in the other direction longitudinally across the water box and forming a compartment in the water box which is in direct communication with the tube nest, and a wall structure embodied in the water box and extending substantially parallel with the dam structure and outboard of the latter, said outboard wall structure forming, with the dam structure, a discharge passageway for circulating water discharged from the tube nest into the water box compartment and spilling over the dam strucure, and an outlet connection provided in the bottom of said discharge passageway.

12. In a water circulating system for a condenser, a substantially cylindrical tube nest having water boxes located at each end thereof, one of said water boxes embodying a partition wall extending vertically across the center of the tube nest and dividing the water box into right and left compartments, an outlet connection for each compartment, a dam structure interposed between each compartment and its outlet connection, said dam structures extending from the bottom of the tube nest upwardly around opposite sides of the tube nest and terminating near the top of the latter, and a discharge passage for each compartment located outboard of the respective dam structures for conveying circulating water spilling over the respective dam structures downwardly to the outlet connections.

In testimony whereof, I have hereunto subscribed my name this 3rd day of October, 1929.

JOSEPH P. LIDIAK.